United States Patent [19]
Quelly et al.

[11] 3,865,880

[45] Feb. 11, 1975

[54] DECOLORIZATION OF KETONES

[75] Inventors: Joseph R. Quelly, Berkeley Heights; Thomas P. McNamara, Atlantic Highlands, both of N.J.

[73] Assignee: Exxon Research and Engineering Company, Lenelen, N.J.

[22] Filed: Sept. 9, 1971

[21] Appl. No.: 179,187

[52] U.S. Cl............. 260/593 P, 252/364, 260/638 P, 260/643 F
[51] Int. Cl.......................... C07c 49/06, C07c 49/10
[58] Field of Search................................. 260/593 P

[56] References Cited
UNITED STATES PATENTS

| | | | |
|---|---|---|---|
| 3,168,571 | 2/1965 | Hare | 260/593 P |
| 3,228,985 | 1/1966 | Carpenter et al. | 260/593 P |
| 3,341,604 | 9/1967 | Quelly | 260/593 P |

OTHER PUBLICATIONS

S.W. Chaikin, et al., JACS Vol. 71 pp. 122–125. (1949).

*Primary Examiner*—Joseph E. Evans
*Assistant Examiner*—David B. Springer
*Attorney, Agent, or Firm*—Frank S. Santoro

[57] ABSTRACT

A method for the treatment of crude off-color alkanone product streams which involves percolating the streams through a bed containing a color-body reducing agent, i.e., metal borohydrides and preferably a filter material in admixture and thereby recoverying a product having an improved color.

8 Claims, No Drawings

3,865,880

DECOLORIZATION OF KETONES

BACKGROUND OF THE INVENTION

This invention relates to an effective process for recovering off-color product streams by treatment of the streams with a bed containing a color-body reducing agent preferably admixed with a filter material in a percolation column or bed. More particularly, the invention describes a method for reducing color bodies and thereby extracting them from crude product streams containing them. The method is carried out by means of percolating said streams through a bed containing a color body reducing agent selected from the group consisting of alkali and alkaline earth metal borohydrides and alkali and alkaline earth metal aluminohydrides and mixtures thereof, which may additionally contain in admixture a filter material such as attapulgus clay. Moreover, the invention relates to an improved process for producing aliphatic ketones; the improvement comprises the percolation of the crude ketone product stream through a bed containing an alkali or alkaline earth metal borohydride or an alkali or alkaline earth metal aluminohydride admixed with a filter material such as attapulgus clay which effectively removes a substantial amount of the color bodies from the ketone stream to thereby provide for the recovery of a ketone product having an improved color.

The process of this invention is particularly applicable to ketones such as methyl isobutyl ketone (MIBK) and metnyl ethyl ketone (MEK), it has been unexpectedly discovered that such ketones having a yellow color in the crude product stream, i.e., 40 on the platinum/cobalt scale, can be substantially converted to water white products by the above-described percolation method. By the term "water white" is meant that the products have a color of 10 or less on the platinum/cobalt scale.

The platnium/cobalt scale is the system of color designation employed by the American Public Health Association for designating the colors of waters. In this system, the unit of color is that produced by 1 mg. of platinum per liter obtained as a standardized combination of potassium chloroplatinate and cobaltous chloride in graduated concentrations. In use, solutions to be measured are put into Nessler tubes and visually compared through the length of the liquid column with standard solutions, similarly contained.

DESCRIPTION OF THE PRIOR ART

In various commercial processes for the production of ketones such as methyl isobutyl ketone it has been found that at times an off-color product is produced. By "off-color" is meant a color on the platinum-cobalt scale of 40 or more. The off-color of the product is due to the presence of color bodies believed to be diketone type impurities. The side reactions which can occur in the manufacturing processes for methyl isobutyl ketone and methyl ethyl ketone and other processes form trace amounts of these diketones which cannot be completely separated by distillation from the product stream. These side-reaction products give the ketones an undesirable yellow color thereby making them less acceptable commercially. Manufacturing specifications for color for these two ketones is set at 10 maximum on the platinum-cobalt scale, and it has been found that concentrations of only 30 parts/million of these diketones impurities can cause the product color to be greater than the 10 maximum.

In U.S. Pat. No. 3,228,985, a process is disclosed for purifying methyl ethyl ketone which comprises extractive distillation with dilute sodium carbonate to remove acetic acid, biacetal and formaldehyde followed by extraction with n-pentane to remove water. The anhydrous stream is then chemically treated to remove unsaturated carbonyls by either oxidizing or hydrogenating them; finally the methyl ethyl ketone is distilled off from the heavy ends.

Other art workers have disclosed the use of sodium borohydride to reduce ketones. For example, a method of reducing and hydrogenating chemical compounds by reacting them with alkali metal borohydrides is described in U.S. Pat. Nos. 2,683,721, 2,856,428 and 2,945,886. The U.S. Pat. No. 2,945,886 reference teaches the selective reduction of nitrile, aldehyde and ketone groups in the presence of ester and nitro groups with the reagent consisting of alkali metal borohydride and boron halide, while the U.S. Pat. No. 2,683,721 reference discloses that alkali metal borohydrides reduce aldehydes and ketone quite rapidly.

All of the prior art workers, however, while disclosing the use of sodium borohydride in solution of various solvents to reduce and hydrogenate various chemical compounds do not teach a method for the selective reduction of diketones in the presence of ketones by means of a solid sodium borohydride alone or in combination with filter materials such as attapulgus clay. Accordingly it is imminently clear that this art is in need of an effective method for decolorizing off-color product streams containing diketone color impurities, particularly ketone streams.

SUMMARY OF THE INVENTION

In accordance with the present invention it has been discovered unexpectedly that crude off-color product streams may be decolorized by passing the streams through a bed containing a color-body reducing agent, preferably in admixture with a filter material such as attapulgus clay. The product stream recovered will have a substantially water-white color by which is meant a color as measured on the platinum-cobalt scale of less than 10.

It has been further unexpectedly discovered that by carefully controlling the treating conditions of the process, the diketone-color bodies may be selectively reduced to thereby improve the overall color of the crude product streams, without forming significant amounts of alcohols or other products which may lower the finished product purity.

The invention particularly relates to a method for improving the color of product streams containing ketones by the percolation of the streams through a bed containing a reducing agent able to reduce the diketone color bodies without simultaneously reducing the ketone product. This selective reducing agent is one selected from the group consisting of alkali and alkaline earth metal borohydrides, alkali and alkaline earth metal aluminohydrides and mixtures thereof. This selective reducing agent may be used alone but is preferably admixed with a filter material such as attapulgus clay.

By the practice of the present invention, any industrial crude product streams that contain diketone-type impurities which contribute to the off-color of the crude product stream may be effectively decolorized by the selective reduction of these diketone color bodies using the selective reducing agent, preferably in admixture with the filter material.

Particularly, however, the method of the invention is suitable for the decolorization of methyl isobutyl ketone and methyl ethyl ketone streams. Other crude product streams amenable to purification by means of the present invention include the crude product streams which contain in a major amount, aliphatic ketones, substituted or unsubstituted, e.g., alkanones, in either straight chain or branched chain and having a carbon range of from 3 to 12 carbon atoms, more preferably from 3 to 8 and most preferably from 3 to 6. Additionally, these crude product streams contain a minor amount of diketone color bodies, the latter contributing to the streams' off-color. Other examples of materials which can be treated by the practice of the present invention include: acetone, methyl ethyl ketone, methyl propyl ketone, methyl n-butyl ketone, methyl amyl ketone, methyl hexyl ketone, methyl isopropyl ketone, methyl isobutyl ketone, methyl iso amyl ketone, 3-pentanone, 3-heptanone, 3-octanone, diisobutyl ketone, and the like.

The reducing agent employed in the practice of the present invention is an alkali or alkaline earth metal borohydride or an alkali or alkaline earth metal aluminohydride which is effective as a selective reducing agent of the diketone type impurities. Examples of reducing agents that are useful in the practice of this invention include sodium borohydride, lithium aluminum hydride, calcium borohydride, lithium borohydride, and the like.

The filter material is any material which will act to remove the diketone color bodies in their reduced state from the product stream. Examples of filter materials useful in the practice of the invention include attapulgus clay, crushed firebrick, charcoal, diatomaceous earth and their mixtures. Preferably, however, attapulgus clay is employed.

As described above, the crude product stream which may be treated by the practice of the present invention may comprise substantially all ketones manufactured by industrial processes but may additionally contain other materials such as esters, acids and aldehydes also produced in the manufacturing process.

The ketones may be decolorized in any apparatus but it is preferred to percolate them through a tower or bed which may be prepared in two sections. The top part contains one volume of a mixture of 1 to 20 wt. percent of the reducing agent such as sodium borohydride powder with the filter material such as attapulgus clay, preferably from 2 to 10 wt. percent and most preferably from 6 to 8 wt. percent. The lower section contains from 1 to 15 volumes of the filter material without the reducing agent such as the sodium borohydride and acts as a filter to remove borohydride reaction products from the ketones.

Additionally, the tower or bed may be prepared in more than two sections and may comprise alternating layers or stages containing the reducing agent, i.e., sodium borohydride, admixed with the filter material followed by a layer of filter material along which in turn is followed by another layer of the reducing agent-filter material admixture, etc. The layers of alternating admixture and filter material may be any number which will satisfactorily reduce the color bodies from the product stream and thereby improve the overall color of the product.

Treating conditions such as flow rates and temperatures are critical to the efficient operation of the inventive process. The optimum treating conditions under which the process is to be carried out are dependent to some extent upon the feed stream being treated. Nevertheless, a feed rate of from about 200 to 600 lbs./hr. per lb. of sodium borohydride and more preferably from about 300 to 500 lbs./hr. and most preferably from about 350 to 400 lbs./hr. per lb. of sodium borohydride is preferred.

The temperatures under which the percolation is to be carried out may vary in the range of from about $-10°$ to about $40°C.$, more preferably from $15°$ to $30°C.$ and most preferably from $20°$ to $30°C.$ Pressures are not critical and preferably the pressure of the system is autogenic. Concentrations of the borohydride in the top section of the bed are in the range of from about 1 to 20 percent by wt., based on the amount of clay, more preferably from 2 to 10 percent by wt., and most preferably from 6 to 8 percent by wight. The contact times for the stream with the bed may range from 1 to 30 minutes, more preferably from 1 to 15 minutes, and most preferably from 2 to 10 minutes.

PREFERRED EMBODIMENT

While the process of the present invention is applicable to all of the above-described feedstreams, as is stated above the most preferred embodiment relates to the decolorization of methyl isobutyl ketone. A preferred feed rate of from about 350 to 400 lbs./hr./lb. of sodium borohydride is employed and concentrations of the sodium borohydride admixed with the attapulgus clay. Preferred contact time for the stream and the bed is from about 2 to 10 minutes and the temperature under which the process is conducted should range from about $20°$ to $30°C.$ In a typical processing scheme methyl isobutyl ketone is passed through a bed consisting of a top section containing from 6 to 8 wt. percent mixture of sodium borohydride in admixture with attapulgus clay followed by a filtering section of pure clay. The rate of feed is from about 350 to 400 lbs. of methyl isobutyl ketone per hour per lb. of sodium borohydride. The temperature is maintained between $20°$ to $30°C.$ and the pressure is autogenic. After a contact time of from about 2 to 10 minutes, the methyl isobutyl ketone stream passes out of the second stage of the bed and an improved overall color is found, i.e., the stream has a substantially water-white color.

The products recoverable by the present method have well known utilities. For example, methyl ethyl ketone and methyl isobutyl ketone are commercially used solvents. The products when treated by the method of the present invention may in some instances have more commercial advantage because of the overall improved color of the product. The present invention may be further illustrated but is not limited to the following examples.

EXAMPLE 1

In this Example, MIBK and MEK were decolorized by the following procedure:

A bed consisting of two sections was prepared as follows. The top part contained one volume of a mixture of sodium borohydride powder (in amounts of from 2 to 100 wt. percent as indicated in Table I) in attapulgus clay. The lower section contained volumes of attapulgus clay without the borohydride. The bed was wetted with the ketone to be decolorized and the heat was allowed to dissipate under static conditions. The bed was then drained and flushed with several volumes of ketone stream before product collection was started with continuous flow through the bed. The temperature was maintained at 25°C. and the flow rates as set forth in Table I were employed.

The results of various runs using this procedure are summarized in Table I and illustrate the effectiveness of the process for decolorizing ketone streams.

Comparing the results of Run 1 with the results of Runs 2-15, the importance of the process conditions necessary for efficient operation, i.e., flow rate and the amount of sodium borohydride in the clay. Compare, e.g., Runs 2-8 with Runs 9, 10, 13, 14 and 15 which show that if the flow rate is too low the amount of carbinol impurities increase. However, as the flow rate is increased above the preferred rates of 300-400, the overall color reduction is lowered; hence, the desirability of maintaining the flow rates within the preferred range is demonstrated.

TABLE II

Borohydride Pellets

| Run No. | Gm MIBK/Hr./ Gm NaBH₄ | Feed Color | Product Color | % MIBC | PPM Boron |
|---|---|---|---|---|---|
| 1 | 13 | 25 | 5 | Tr | .08 |
| 2 | 27 | 25 | 5 | — | — |
| 3 | 32 | 25 | 10+ | — | — |
| 4 | 52 | 25 | 10 | 0 | .08 |
| 5 | 65 | 25 | 10 | 0 | .02 |
| 6 | 114 | 25 | 15 | 0 | .25 |
| 7 | 141 | 25 | 12 | — | — |
| 8 | 161 | 25 | 15 | 0 | 0 |
| 9 | 233 | 25 | 20 | — | — |
| 10 | 274 | 25 | 20 | — | — |

EXAMPLE 3

The procedure of Example 1 was repeated in two sets of comparison runs. In one of these runs colored MIBK was treated with the borohydride clay mixture in a column and in the other run the same colored MIBK under identical conditions was treated in batchwise fashion with an equal amount of borohydride powder without the clay.

These runs are summarized in Table III and show that

TABLE I

BOROHYDRIDE POWDER

| Run No. | Gm MIBK/Hr./ Gm NaBH₄ | Capacity No. NaBH₄/M gal. | % NaBH₄ in Clay | Feed Color | Product Color | % MIBC | PPM Boron | |
|---|---|---|---|---|---|---|---|---|
| 1 | — | — | 0 | 25 | 25 | | | Blank run with clay. |
| 2 | 805 | .39 | 2 | 25 | 7 | .06 | .02 | |
| 3 | 1878 | .44 | 2 | 25 | 12 | 0 | .02 | |
| 4 | 4300 | .37 | 2 | 40 | 12 | .05 | — | |
| 5 | 1560 | .88 | 5 | 25 | 12 | | | |
| 6 | 2950 | .54 | 5 | 25 | 11 | .02 | Nil | |
| 7 | 2950 | .54 | 5 | 25 | 11 | .02 | .17 | |
| 8 | 344 | .27 | 7 | 25 | 8 | .03 | .09 | |
| 9 | 211 | — | 10 | 25 | 5 | .24 | 1 | |
| 10 | 290 | — | 10 | 25 | 5 | .24 | 1 | |
| 11 | 724 | .51 | 10 | 25 | 10 | 0 | .08 | |
| 12 | 802 | — | 10 | 25 | 5 | .05 | .08 | |
| 13 | 29.8 | — | 20 | 40 | 5 | 1.54 | — | |
| 14 | 221 | — | 20 | 25 | 5 | .22 | | Product cloudy. |
| 15 | 152 | — | 100 | 25 | 5 | | | Column plugged-product cloudy. |
| | Gm MEK/Hr./ Gm NaBH₄ | | | | | % SBOH | | |
| 16 | 342 | — | 7 | 25 | 5 | .06 | — | |

TABLE III

| | Borohydride-Clay Mixture | Batch Test | Borohydride-Clay Mixture | Batch Test |
|---|---|---|---|---|
| Minutes Contact | 1.5 | 10 | 3.8 | 10 |
| Treat Gm NaBH₄/L | 0.07 | 0.08 | 0.032 | 0.032 |
| Feed Color | 40 | 40 | 25 | 25 |
| Product Color | 11 | 25 | 8 | 25 |

EXAMPLE 2

Following the procedure of Example 1, a series of runs were made in which sodium borohydride pellets were used in place of the sodium borohydride powder-clay mixture.

The results of these runs are summarized in Table II and show that the treatment of MIBK with borohydride pellets without the clay in admixture will also improve the color of the final ketone product.

treating the colored MIBK with the borohydride clay mixture is more effective than treating with borohydride by itself. For example, in Run 1 a reduction in color with the borohydride-clay mixture of 29 was produced as compared with a color reduction of only 15 which was obtained by treatment in batchwise manner with the borohydride powder without the clay.

EXAMPLE 4

The procedure of Example 1 is repeated using lithium borohydride admixed with diatomaceous earth in place of sodium borohydride admixed with attapulgus clay and an overall improvement in the color of the methyl isobutyl ketone is obtained.

EXAMPLE 5

The procedure of Example 1 is repeated to treat a crude product stream comprising ethanol and an improvement in the overall color of the ethanol stream is obtained.

What is claimed is:

1. A method for decolorizing off-color ketone streams containing alkanones having from 3–12 carbon atoms and containing color causing impurities comprising diketone color bodies, which method comprises passing said streams through a bed comprising in admixture as alkali metal borohydride and a filter material selected from the group consisting of attapulgus clay, crushed firebrick, diatomaceous earth and mixtures thereof wherein the amount of alkali metal borohydride is in the range of from about 1–20 percent by weight based on the amount of filter material present in admixture and at a temperature in the range of from 15°–30°C and a feed rate of from about 300–500 lbs./hr. based on the amount of alkali metal borohydride employed, said feed rate providing a contact time of from 1–30 minutes for said streams with said bed, and thereafter recovering a substantially water-white ketone containing stream.

2. The method of claim 1 wherein the alkali metal borohydride is sodium borohydride.

3. The method of claim 1 wherein said alkanone is selected from the group consisting of methyl ethyl ketone and methyl isobutylketone.

4. The process of claim 1 wherein said streams are passed through said bed for contact times in the range of from 1 to 15 minutes.

5. The process of claim 1 wherein said alkanone is methyl isobutyl ketone.

6. The process of claim 1 wherein said alkanone is methyl ethyl ketone.

7. The process of claim 3 wherein said filter material is attapulgus clay.

8. The process of claim 7 wherein said borohydride is present in concentrations of from 6 to 8 wt. percent based on the amount of filter material present.

* * * * *